(12) United States Patent
Kiss

(10) Patent No.: US 10,094,657 B2
(45) Date of Patent: Oct. 9, 2018

(54) STATIONARY AUTOMATED SIGNALING EQUIPMENT INSPECTION SYSTEM USING LIDAR

(71) Applicant: ALSTOM TRANSPORT TECHNOLOGIES, Saint-Ouen (FR)

(72) Inventor: James Kiss, Melbourne, FL (US)

(73) Assignee: ALSTOM TRANSPORT TECHNOLOGIES, Saint-Ouen (FR)

(*) Notice: Subject to any disclaimer, the term of this patent is extended or adjusted under 35 U.S.C. 154(b) by 1 day.

(21) Appl. No.: 15/281,628

(22) Filed: Sep. 30, 2016

(65) Prior Publication Data

US 2018/0094920 A1      Apr. 5, 2018

(51) Int. Cl.

| | | |
|---|---|---|
| *G06K 9/00* | (2006.01) | |
| *G01B 11/27* | (2006.01) | |
| *G06T 7/00* | (2017.01) | |
| *G06T 7/20* | (2017.01) | |
| *G01S 17/89* | (2006.01) | |
| *G01S 13/89* | (2006.01) | |
| *G01B 15/00* | (2006.01) | |

(52) U.S. Cl.
CPC ............ *G01B 11/272* (2013.01); *G01B 15/00* (2013.01); *G01S 13/89* (2013.01); *G01S 17/89* (2013.01); *G06T 7/001* (2013.01); *G06T 7/2033* (2013.01); *G06T 2207/10028* (2013.01); *G06T 2207/10044* (2013.01); *G06T 2207/30108* (2013.01); *G06T 2207/30236* (2013.01)

(58) Field of Classification Search
CPC ....... G01B 11/272; G01B 15/00; G01S 13/89; G01S 17/89; G06T 7/001; G06T 7/2033; G06T 2207/10028; G06T 2207/10044; G06T 2207/30108; G06T 2207/30239
See application file for complete search history.

(56) References Cited

U.S. PATENT DOCUMENTS

| | | | | |
|---|---|---|---|---|
| 9,175,998 B2* | 11/2015 | Turner | ................ | E01B 27/022 |
| 9,919,723 B2* | 3/2018 | Bhagwatkar | ............ | B61L 23/00 |
| 2014/0339374 A1* | 11/2014 | Mian | .................... | G08G 1/0175 246/473.1 |
| 2016/0159381 A1* | 6/2016 | Fahmy | ................ | B61L 15/0081 701/19 |

* cited by examiner

*Primary Examiner* — Gregory M Desire
(74) *Attorney, Agent, or Firm* — Young & Thompson

(57) ABSTRACT

An automated signaling equipment inspection system is provided. The system includes signaling equipment, a LiDAR imaging device permanently installed close to the signaling equipment at a position and with an orientation allowing complete imaging of the orientation and configuration in space of the signaling equipment and of any potential movement of the signaling equipment during its operation, an image data processing device for detecting a non-conformity of the signaling equipment, and a reference image database storing reference image data of the signaling equipment. The LiDAR imaging device is configured to scan the signaling equipment to obtain real image data thereof. The image data processing device is configured to detect a non-conformity of the signaling equipment by comparing the real image data with reference image data taken from the reference image database.

11 Claims, 2 Drawing Sheets

STATIONARY AUTOMATED SIGNALING EQUIPMENT INSPECTION SYSTEM USING LIDAR

BACKGROUND OF THE INVENTION

The present invention relates generally to wayside equipment of railroad tracks and more particularly to the inspection of signaling equipment installed close to or on a railroad track, such as grade crossing signaling equipment or point machines.

US federal regulations require periodic inspection of grade crossings and their equipment. The inspections typically involve trained personnel, which has to go to the grade crossing and visually inspect the crossing and the equipment. The personnel must check whether signaling lamps are properly aimed and crossing gates are working properly. This is time consuming and expensive.

Crossing gates must be precisely positioned and signaling lamps must be precisely aimed so that the maximum light intensity is within the field of vision of a motor vehicle operator in the road. On train approach the lamps flash and the gates are lowered within a defined amount of time. Currently, imprecise aiming of lights or changes to operating positions of the gates are undetectable except through human inspection.

In an attempt to reduce human intervention and inspection costs, the Office of Research, Development and Technology (ORDT) of the US Federal Railroad Administration (FRA) has developed an automated grade crossing survey system in cooperation with the University of Michigan and the company ENSCO, Inc. This system is detailed in the article "*The Federal Railroad Administration's Automated Grade Crossing Survey System*" by Soheil Saadat et al published in the Proceedings of the American Railway Engineering and Maintenance-of-Way Association (AREMA), 2015, which can be downloaded at https://april.eecs.umich.edu/papers/details.php?name=saadat2015.

This known system consists of a set of LiDAR sensors installed on a gage restraint measurement rail car. When the rail car travels through a grade crossing, the LiDAR sensors scan the grade crossing and its surroundings. The scan creates a point cloud representation of the grade crossing. The point cloud is used to assess the surface profile of the grade crossing in order to detect humped grade crossings that might be prone to hang-up incidents with heavy motor vehicles.

A similar system using a modified surveying truck is described in the article "*Automated Safety Inspection of Grade Crossings*" by Pradeep Ranganathan et al., presented at the 2010 International Conference on Intelligent Robots and Systems (IROS), which can be downloaded at https://www.semanticscholar.org/paper/Automated-safety-inspection-of-grade-crossings-Ranganathan-Oison/0a0d4055a20170c94972229ee9e76af4b539ff22.

These known moving systems with travel-by inspection are neither designed nor adapted to check the exact alignment and proper operation of grade crossing equipment such as signaling lamps and crossing barriers. Indeed, since the LiDAR sensors are installed on a moving vehicle, the point clouds obtained from a grade crossing will be subject to noise generated by the movement of the vehicle. Such noise prevents the detection of small misalignments in the grade crossing equipment. Also, the LiDAR system can only make a short snapshot of the grade crossing while traveling by. Hence, a prolonged movement of e.g. a crossing gate when it moves from its raised position to its lowered position cannot be captured and analyzed.

Grade crossing inspection might also be performed with video imaging and analysis. However, video analytics do not provide distance and are susceptible to weather and lighting conditions.

BRIEF SUMMARY OF THE INVENTION

In one embodiment, an automated signaling equipment inspection system is provided. The system comprises a signaling equipment, an active ranging imaging device permanently installed close to the signaling equipment at a position and with an orientation allowing complete imaging of the orientation and configuration in space of the signaling equipment and of any potential movement of the signaling equipment during its operation, and an image data processing device for detecting a non-conformity of the signaling equipment. The active ranging imaging device is configured to scan the signaling equipment to obtain real image data thereof. The image data processing device is configured to detect a non-conformity of the signaling equipment by either comparing said real image data with a reference image data of the signaling equipment taken from a reference image database or by comparing real image data from successive scans.

DETAILED DESCRIPTION OF THE INVENTION

Figure 1:
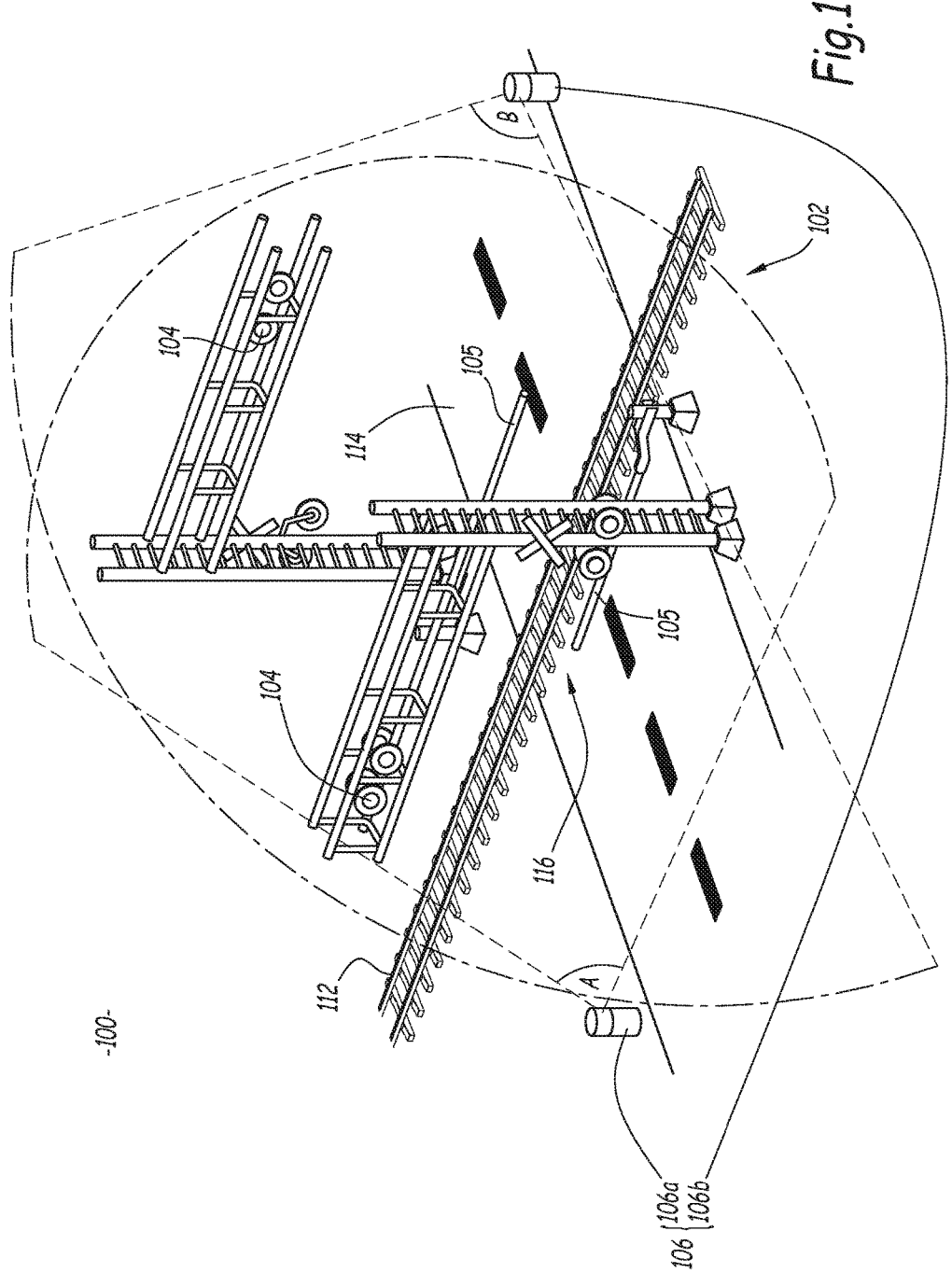
FIG. 1 is a perspective view of an automated grade crossing signaling equipment inspection system according to one embodiment of the invention.

FIG. 1 illustrates an automated grade crossing signaling equipment inspection system 100. The system 100 is used to automate the inspection of signaling equipment at grade crossings. The system 100 comprises a grade crossing 102, signaling equipment 104 and 105, an active ranging imaging device 106, an image data processing device 108 (cf. FIG. 2), and a reference image database 110.

In the usual way, the grade or level crossing 102 is a crossing of a railway line 112 and a motor road 114. In order to prevent rail-road accidents, the grade crossing 102 is provided at its intersection 116 between the railway line 112 and the motor road 114 with signaling equipment 104 and 105. The signaling equipment 104 and 105 alerts a motor vehicle driver about an incoming train and forces the driver to stop in front of the intersection 116 until the train has passed. To that end, the signaling equipment includes a set of signaling lamps 104 and two crossing gates 105. The crossing gates 105 move between a raised position and a lowered position shown in FIG. 1. The signaling lamps 104 start flashing and the crossing gates 105 are lowered when a train is approaching. It is important that the signaling lamps 104 are correctly aligned and that the crossing gates 105 work properly to prevent any accidents. Hence, this equipment must be regularly inspected.

In the present embodiment, this inspection is automated thanks to the active ranging imaging device 106. The device 106 operates with LiDAR. However, RADAR or another active ranging technique may also be used. The LiDAR imaging device 106 is configured to scan the signaling equipment 104, 105 to obtain real image data thereof. The LiDAR imaging device 106 comprises two separate LiDAR scanning units 106a, 106b permanently installed at two different positions with different viewing angles A and B around the grade crossing 102. Preferably, the two LiDAR scanning units 106a, 106b are installed on opposite sides of the grade crossing. Both LiDAR scanning units 106a, 106b are able to scan their surroundings vertically and horizontally within the solid angle A and B, respectively. They are installed at the grade crossing 102 at a position and with an orientation allowing complete imaging of the orientation and configuration in space of the signaling equipment 104, 105 and of any potential movement of the signaling equipment during its operation. The two LiDAR scanning units 106a, 106b can provide independent confirmation to eliminate common mode errors.

Figure 2:
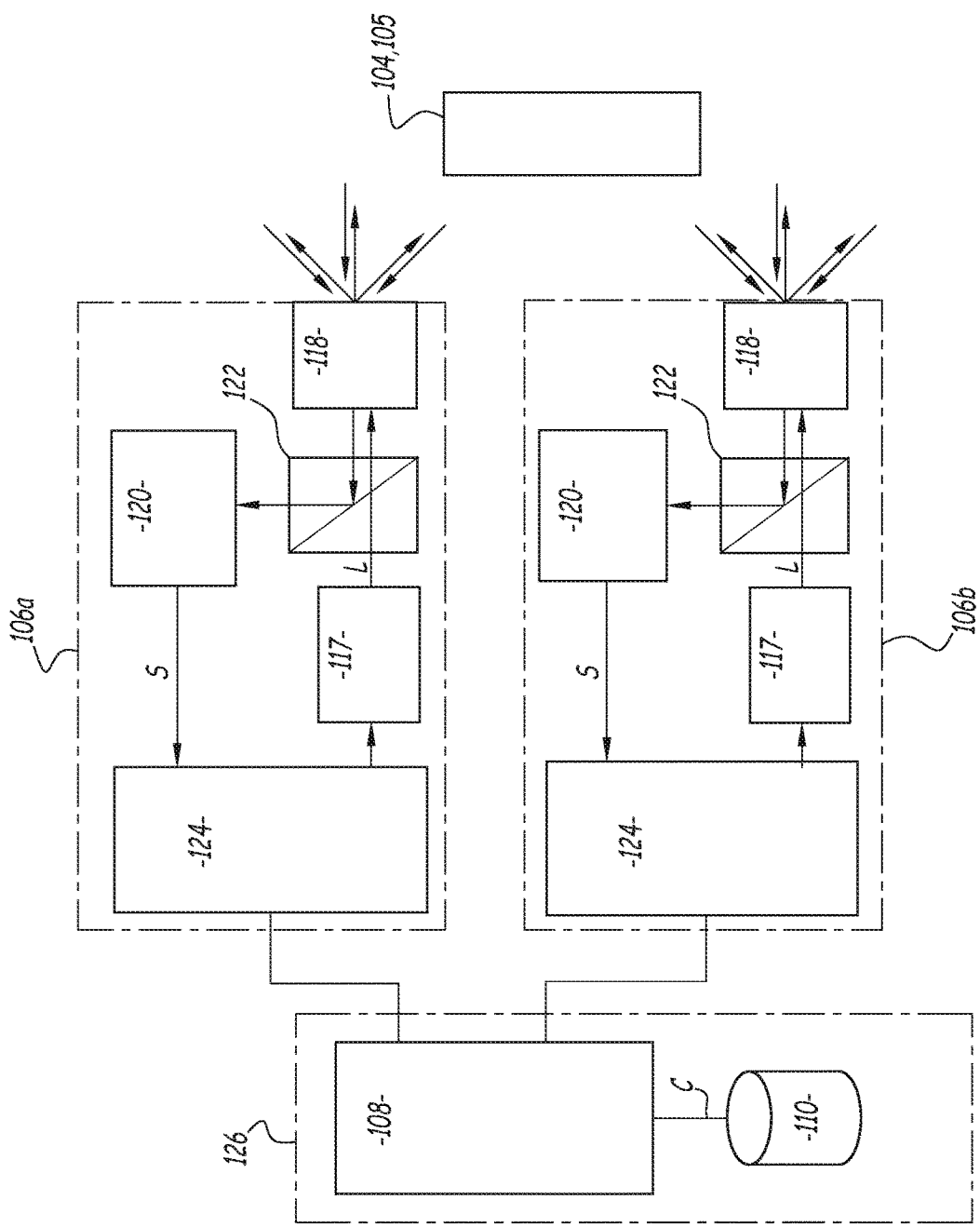
FIG. 2 is a block diagram of the LiDAR imaging device and associated processor and database of the system of FIG. 1.

The LiDAR scanning units 106a, 106b are shown in more detail in FIG. 2. Each scanning unit 106a and 106b includes a laser 117 emitting a laser beam L, a scanner 118 for sweeping the laser beam L over the surroundings of the scanning unit 106a, 106b, a detector 120 for detecting the laser light reflected from the surroundings, optics 122 for directing the reflected laser light towards the detector 120, and a signal processor 124 for formatting the raw data S outputted by the detector 120. Both signal processors 124 are connected to the image data processing device 108.

The reference image database 110 is accessed by the image data processing device 108 via a data connection C. The device 108 and the database 110 may be integrated into a single processing unit 126.

The reference image database 110 stores reference image data of the signaling equipment 104, 105. In particular, it may store a first reference image of the crossing gate 105 in its raised position and a second reference image of the crossing gate 105 in its lowered position.

The automated grade crossing signaling equipment inspection system 100 operates as follows.

In one mode of operation, system 100 inspects a signaling lamp 104 for proper alignment with respect to the road 114. To this end, the scanners 118 of both scanning units 106a, 106b, scan the entire surface of the signaling lamp 104. The point cloud obtained by each scanning unit 106a, 106b is an independent 3 dimensional (3D) digital representation of signaling lamp 104, which is pre-processed in the signal processors 124. The two point clouds are then analyzed in the image data processing device 108. This real image data is compared with reference image data stored in the reference image database 110. In other words, the real 3D image of the signaling lamp obtained by scanning is compared with a reference image of how the signaling lamp should look like and be oriented. If there are discrepancies between the two images, the image data processing device 108 concludes that the signaling lamp 104 is non-conformant, i.e. that the signaling lamp 104 is physically misaligned or has some other defect or malfunction. This problem may be reported to a surveillance center, which could then dispatch maintenance personnel to realign the signaling lamp 104.

Alternatively, successive real-time image data taken from several scans are compared to detect changes in the positioning of a mechanical apparatus and in our case of the signaling lamp.

Another alternative is to compare successive real-time image data taken from several scans, with reference image data, to determine changes in behavior of a mechanical apparatus and in our case of the signaling lamp.

In a second mode of operation, system 100 monitors the proper opening and closing of a crossing gate 105. To this end, the reference image database 110 includes a first reference image of the crossing gate 105 in its raised position and a second reference image of the crossing gate 105 in its lowered position. The scanning units 106a, 106b scan the crossing gate 105. The image data processing device 108 determines that the crossing gate 105 is raised or lowered when the real image data of the crossing gate 105 obtained from scanning matches the first or second reference image. The scanning units 106a, 106b continuously scan the crossing gate 105. When the crossing gate 105 is raised because a train has passed by or lowered because a train is approaching, this movement is detected by the image data processing device 108. That is, the image data processing device 108 continuously compares the real image data of the crossing gate 105 with the first and second reference image. If the real image data of the crossing gate no longer matches any of the first or second reference images, then the crossing gate 105 is assumed to be moving.

Once it has detected movement, the image data processing device 108 starts a countdown timer. The amount of time set by the timer is the time it should normally take the crossing gate to open or close. If, by the end of the amount of time set by the timer, the image data processing device 108 fails to detect a match between the current real image data of the crossing gate and the first or second reference image, respectively, the image data processing device 108 concludes that the crossing gate 105 has a malfunction. The image data processing device 108 may indicate this to a surveillance center. Maintenance personnel may then be dispatched from the center to repair the crossing gate 105.

By high frequency scanning of moving signaling equipment, the system 100 may acquire the real movement profile of the signaling equipment. This profile can then be compared with an expected movement profile stored in database 110. If the real movement profile does not match the expected movement profile, system 100 may again deduce that the signaling equipment is defective. Through discrete sample comparison and trending techniques, degraded operation or performance of the signaling equipment may be inferred. The use of diagnostic and prognostic algorithms allows predicting the time of failure of the signaling equipment and to take timely corrective action.

Image data captured over an extended period of time can also prove that the equipment remained within expected position and performance parameters over the sample period.

Alternatively, the signaling equipment is a point machine and the system 100 is used for the inspection of the point machine. In this alternative the same type algorithm could be used to track movement of switch points to determine any degradation.

While the invention has been described in terms of various specific embodiments, those skilled in the art will recognize that the invention can be practiced with modification within the spirit and scope of the claims.

What is claimed is:

1. An automated signaling equipment inspection system comprising:
   signaling equipment;
   an active ranging imaging device permanently installed close to the signaling equipment at a position and with an orientation allowing complete imaging of the orientation and configuration in space of the signaling equipment and of any potential movement of the signaling equipment during its operation; and an image data processing device for detecting a non-conformity of the signaling equipment;

wherein the active ranging imaging device is configured to scan the signaling equipment to obtain real image data thereof, and wherein the image data processing device is configured to detect a non-conformity of the signaling equipment by either comparing said real image data with a reference image data of the signaling equipment taken from a reference image database or by comparing real image data from successive scans.

2. The system of claim 1, wherein said non-conformity is a physical misalignment or a malfunctioning of the signaling equipment.

3. The system of claim 1, wherein the active ranging imaging device comprises two or more separate active ranging scanning units permanently installed at different positions with different viewing angles around the signaling equipment.

4. The system of claim 3, wherein the active ranging scanning units are installed on opposite sides of the signaling equipment.

5. The system of claim 1, wherein the signaling equipment is a signaling lamp.

6. The system of claim 1, wherein the signaling equipment is a point machine.

7. The system of claim 1, wherein the signaling equipment is a crossing gate.

8. The system of claim 7, wherein the reference image database includes a first reference image of the crossing gate in its raised position and a second reference image of the crossing gate in its lowered position, and wherein the image data processing device is configured to:

determine that the crossing gate is raised or lowered when real image data of the crossing gate obtained from the active ranging imaging device matches said first or second reference image;

detect a movement of the crossing gate when real image data of the crossing gate obtained from the active ranging imaging device no longer matches any of said first or second reference images;

indicate a malfunction of the crossing gate if:
  i) real image data of the crossing gate obtained from the active ranging imaging device after having detected a movement of the crossing gate away from the raised position fails to match said second reference image for more than a set amount of time, indicating that the crossing gate does not close properly; or
  ii) real image data of the crossing gate obtained from the active ranging imaging device after having detected a movement of the crossing gate away from the lowered position fails to match said first reference image for more than a set amount of time, indicating that the crossing gate does not open properly.

9. The system of claim 1, wherein said signaling equipment is a type of equipment that moves during its operation, wherein said real image data is a recording of the real movement of said signaling equipment, and wherein said reference image data is a representation of the movement expected from said signaling equipment.

10. The system of claim 1, wherein the active ranging imaging device is configured for vertical and horizontal scanning.

11. The system of claim 1, wherein the active ranging imaging device operates with LiDAR or RADAR.

* * * * *